United States Patent [19]

Thyret

[11] 3,929,799

[45] Dec. 30, 1975

[54] PROCESS FOR PRODUCING VINYL PYRIDINE COMPOUNDS

[75] Inventor: Helmut Eugen Thyret, Munich, Germany

[73] Assignee: Consortium fur Elecktrochemische Industrie GmbH, Munich, Germany

[22] Filed: Jan. 20, 1971

[21] Appl. No.: 108,138

[30] Foreign Application Priority Data

Jan. 22, 1970 Germany............................ 2002661

[52] U.S. Cl...... 260/290 V; 260/283 R; 260/279 R; 260/269
[51] Int. Cl.$^2$............... C07D 313/06; C07D 215/06; C07D 217/02; C07D 219/02
[58] Field of Search ....... 260/290 V, 290, 283, 279, 260/269

[56] References Cited

UNITED STATES PATENTS

| | | | |
|---|---|---|---|
| 2,512,660 | 6/1950 | Mahan............................ | 260/290 V |
| 2,698,848 | 1/1955 | Mahan............................ | 260/290 V |
| 2,754,300 | 7/1956 | MacLean et al................ | 260/290 V |
| 3,042,682 | 7/1962 | Aries................................ | 260/290 V |

*Primary Examiner*—Harry I. Moatz
*Attorney, Agent, or Firm*—Allison C. Collard

[57] ABSTRACT

A process for producing 2- or 4-vinyl pyridine by reacting with formaldehyde in a single reaction step, an alkyl derivative of pyridine, the alkyl group or groups containing 1–2 C atoms, or two adjacent groups forming a benzene ring, the reation being performed in the presence of an acid having a pH-valve below 5, at an excess pressure of 30–100 atmospheres and a temperature of 200°–300°C.

4 Claims, No Drawings

PROCESS FOR PRODUCING VINYL PYRIDINE COMPOUNDS

Methods for producing 2- and 4-vinyl pyridine compounds by the reaction of 2- and 4-methylpyridines with formaldehyde in two separate steps are known. In the first step the corresponding 2- or 4-(2-hydroxyethyl) pyridine compound is formed by the reaction of 2- or 4-methypyridine compounds with formaldehyde. There the reaction speed is economically unsatisfactory. Thus Japanese Pat. No. 18,285 (reported in CA 56, 2429 e) indicates a staying period of 4.5 hours to achieve a conversion of 50 – 60%.

In British Pat. No. 850,114, after a staying period of 1.5 hours in a two-step process a yield of 50 – 70%, referred to the pyridine compound used, is achieved, but to avoid any secondary reactions of the created 2- or 4-(2-hydroxyethyl) pyridines with formaldehyde a 6 : 1 excess of the 2- or 4-methylpyridine compounds to formaldehyde is used.

The second step, the dehydration of the 2- or 4-(2-hydroxyethyl) pyridine compound alone into the corresponding 2- or 4-vinyl compound is successfully carried out by distilling over a basic compound (U.S. Pat. No. 2,848,456; British Pat. No. 632,661).

Compared to this, I have now discovered a process for producing 2- or 4-vinyl pyridine compounds which is characterized by the fact that I convert 2- or 4-methylpyridine compounds with formaldehyde in the presence of an acid catalyst, if desired in the presence of a solvent and perhaps of a polymerization inhibitor, in one reaction step.

The process of the invention has the advantage that staying periods of only a few minutes are required, so that I obtain volume-time yields which are economically significant. Moreover, the desired vinyl pyridine can be obtained in a technically simple manner in one step.

Technically interesting yields of up to more than 80% can be obtained with the process of the invention with a 2 : 1 excess of the methylpyridine compound, which is important because the vinyl pyridine content in the reaction mixture is considerably higher, and therefore processing is easier. One has fewer unconverted methyl pyridine compounds to re-distil and the polymerization-prone vinyl pyridine is obtained more easily in pure form. If one works with a greater excess of pyridine compound, the yields of vinyl pyridine are up to more than 90%.

One understands as 2- or 4-methylpyridine compounds those compounds which in the 2- and/or 4- and/or 6-position to nitrogen of a pyridine ring system carry a methyl group, and which are otherwise substituted at will. Such compounds are for instance 2-picoline, 4-picoline, 2,4-lutidine, 2,6-lutidine, 2,4,6-collidine, 2,3,6-collidine, 2-methyl-5-ethylpyridine, quinaldine (=2-methylquinoline), lepidine (=4methylquinoline), 1-methylisoquinoline, 3-methylisoquinoline, 9-methylphenantridine, 9-methylpenanthridine.

The formaldehyde can be brought to reaction in gaseous form, as paraformaldehyde or in aqueous solution. Preferred is the use of an aqueous formaldehyde solution.

The molar proportion of the reaction components, 2- or 4-methylpyridine compounds to formaldehyde can vary between 2:1 and 5:1. Preferred is a proportion of 3.5 : 1.5. The reaction can also be carried out in a solvent.

Inorganic or organic acids can serve as catalysts. Particularly favorable are acids with a pH value of less than 5, like sulphuric acid, hydrochloric acid, phosphoric acid, alkyl- or arylsulfonic acid or carboxylic acids like acetic acid, formic acid. The acid can be used in solution or on an inert carrier. Preferred concentrations are 1 – 20 mol %, particularly 5 – 10 mol % referred to the formaldehyde used.

The process can be carried out continuously or discontinuously. The use of pressures between 30 and 100 atmospheres excess pressure is useful. Favorable is a pressure of 50 atmospheres excess pressure. Suitable temperatures are between 200° and 300° C. Preferred are temperatures between 240° and 280° C.

The residence times of the reaction mixture in the reaction chamber are a few minutes according to the process of the invention; preferred are 2 to 10 minutes.

According to one embodiment of the invention, the 2- or 4-methylpyridine compound and the aqueous solution of formaldehyde, the former in a molar excess of 2 : 1, a strong acid in a quantity of 5 – 10 mol %, referred to formaldehyde, and optionally a polymerization inhibitor, are piped through a flow tube so that the reaction mixture is under a pressure of 50 atmospheres excess pressure and shows a temperature of 240° – 280°C. The emerging mixture is cooled as quickly as possible and the pressure is released. After separation of the acid by means of a base like ammonia, hydroxides, oxides or carbonates of sodium, potassium, calcium or barium, the 2- or 4-vinyl pyridines are separated therefrom by known methods, e.g. by distilling. The unconverted starting substance is subsequently returned to the reaction again.

The process of the invention is explained in detail in the following examples.

EXAMPLE 1

The reaction components are led into a coiled pipe with a volume of 900 cu. cm. through two separate lines by means of pumps. Through one line 12,000 cu. cm (11,100 g) of 2-methyl-5-ethylpyridine are carried per hour, through the other 1,400 cu. cm. of a mixture consisting of 1,360 cu. cm. (1,475 g) of 37% aqueous formaldehyde and 50 cu. cm. (91 g) of concentrated sulphuric acid. The molar proportion of 2-methyl-5-ethylpyridine to formaldehyde to sulphuric acid is 5 : 1 : 0.05. The coiled pipe is heated by an oil bath in such a manner that an average reaction temperature of 260° C is set. The reaction pressure is maintained at 50 atmospheres excess pressure, the residence time is 4 minutes.

One obtains per hour a reaction mixture containing 9,570 g of unconverted 2-methyl-5-ethylpyridine, 1,420 g 2-vinyl-5-ethylpyridine and 136 g 2-(2-hydroxyethyl)-5-ethylpyridine. From this a conversion of 69% is calculated. The yield of 2-vinyl-5-ethylpyridine after processing is 93% based on 2-methyl-5-ethylpyridine converted.

EXAMPLE 2

A reaction solution was prepared of 4,000 cu. cm. (3,660 g) 2-methyl-5-ethylpyridine, 750 cu. cm. (818 g) of a 37% aqueous formaldehyde solution and 30 cu. cm. (52.5 g) of an 89% phosphoric acid. This solution contained 80.8% 2-methyl-5-ethylpyridine, 6.7% formaldehyde, 11.5% water and 1.0% phosphoric acid (% by weight). The molar proportion of 2-methyl-5-ethylpyridine to formaldehyde to phosphoric acid is 3 : 1 :

0.05.

1880 cu. cm./h of the above solution is pumped through a coiled pipe with a volume of 900 cu. cm. heated by an oil bath. This corresponds to an hourly throughput of 1454 g 2-methyl-5-ethylpyridine and 121 g formaldehyde. The reaction pressure is maintained at 50 atmospheres excess pressure, the reaction temperature at 211° C. From 1454 g of 2-methyl-5-ethylpyridine one obtains a reaction mixture containing 1147 g 2-methyl-5-ethylpyridine, 237 g 2-vinyl-5-ethylpyridine and 44 g 2-(-hydroxyethyl)-5-ethylpyridine. The computed conversion from this is 63%. The yield of 2-vinyl-5-ethylpyridine after processing is 82%, referred to the converted 2-methyl-5-ethylpyridine.

EXAMPLE 3

A reaction solution was prepared from 4000 cu. cm. (3660 g) 2-methyl-5-ethylpyridine, 750 cu. cm. (818 g) of a 37% aqueous formaldehyde solution, 530 g methanol and 30 cu. cm. (52.5 g) 89% phosphoric acid. This solution contains 72.4% 2-methyl-5-ethylpyridine, 6.0% formaldehyde, 10.3% water, 10.4% methanol and 0.9% phosphoric acid. The molar proportion 2-methyl-5-ethylpyridine to formaldehyde to phosphoric acid is 3 : 1 : 0.05.

Of this reaction solution 1800 cu. cm./h were pumped through a coiled pipe with a volume of 900 cu. cm. which was heated by an oil bath. The reaction pressure is set at 50 atmospheres overpressure, the reaction temperature is 215° C. The reaction mixture created from 1305 g 2-methyl-5-ethylpyridine contains 1076 g 2-methyl-5-ethylpyridine, 160 g 2-vinyl-5-ethylpyridine and 44 g 2-(hydroxyethyl)-5-ethylpyridine. This results in a 53% conversion. The yield of vinyl pyridine compound after processing is 78%, referred to the converted 2-methyl-5-ethylpyridine.

EXAMPLE 4

The test equipment is the same as in Example 1. Through one line 4190 cu. cm./h (3840 g) 2-methyl-5-ethylpyridine are carried, through the other line 1215 cu. cm./h of a mixture consisting of 7500 cu. cm. of a 37% aqueous formaldehyde solution, 300 cu. cm. (550 g) concentrated sulphuric acid and 24 g 2,6-di-t-butylphenol as a stabilizer. The molar proportion 2-methyl-5-ethylpyridine to formaldehyde to sulphuric acid is 2 : 1 : 0.05. The staying time is 10 minutes. Through an oil bath the coiled pipe is heated in such a manner that a reaction temperature of 240° C is set. The reaction pressure is held at 50 atmospheres overpressure.

From 3840 g of 2-methyl-5-ethylpyridine used a reaction mixture is obtained which contains 2715 g 2-methyl-5-ethylpyridine, 890 g 2-vinyl-5-ethyl pyridine and 82 g 2-(2-hydroxyethyl) -5-ethylpyridine. This corresponds to a conversion of 57%. The total yield of vinyl pyridine compound after processing is 80%, referred to the converted 2-methyl-5-ethylpyridine.

EXAMPLE 5

The test equipment is the same as in Example 1. Through one line are carried per hour 4300 cu. cm. (3940 g) 2-methyl-5-ethylpyridine in which 30 g 2,6-di-t-butyl-4-methyl-phenol are dissolved, and through the other line per hour 1000 cu. cm. of a 37% aqueous formaldehyde solution in which 40 cu. cm. concentrated sulphuric acid have been dissolved. The molar proportion 2-methyl-5-ethylpyridine to formaldehyde to sulphuric acid is 2.4 : 1 : 0.1, the reaction temperature is 240° C, the reaction pressure 50 atmospheres excess pressure, the residence time 10 minutes.

In the reaction product one obtains per hour 2920 g 2-methyl-5-ethylpyridine, 885 g 2-vinyl-5-ethylpyridine and 14 g 2-(2-hydroxyethyl)-5-ethylpyridine. From this the calculated conversion is 64%. The yield of vinyl pyridine compound after processing is 78%, referred to the converted 2-methyl-5-ethylpyridine.

EXAMPLE 6

Of a solution consisting of 4000 cu. cm. (3660 g) 2-methyl-5-ethylpyridine, 750 cu. cm. (818 g) of a 37% aqueous formaldehyde solution, 300 g water and 28.2 g glacial acetic acid, 1800 cu. cm. are pumped per hour through a coiled pipe with a volume of 900 cu. cm. which is heated by an oil bath to 215° C and which is under a pressure of 50 atmospheres overpressure. The residence time is 30 minutes, the molar proportion 2-methyl-5-ethylpyridine to formaldehyde to acetic acid is 3 : 1 : 0.05. From 3660 g 2-methyl-5-ethylpyridine one obtains after the reaction 2962 g unconverted 2-methyl-5-ethylpyridine, 500 g 2-vinyl-5-ethylpyridine and 146 g 2-(2-hydroxyethyl)-5-ethylpyridine. This results in a conversion of 57%. The yield of vinyl pyridine compounds after processing is 83%, referred to the converted 2-methyl-5-ethylpyridine.

EXAMPLE 7

The test equipment is the same as in Example 1. Through one line 7730 cu. cm. (7060 g) 2-methyl-5-ethylpyridine are carried per hour, through the other line 2130 cu. cm. of a mixture consisting of 877 g formaldehyde, 1510 g water and 135 g sulphuric acid. The reaction temperature is 250° C, the pressure 50 atmospheres overpressure, the residence time 5.5 minutes, the molar proportion 2-methyl-5-ethylpyridine to formaldehyde to sulphuric acid 2 : 1 : 0.05. The mixture obtained per hour contains 5050 g of unconverted 2-methyl-5-ethylpyridine, 1642 g 2-vinyl-5-ethylpyridine and 174 g 2-(2-hydroxyethyl)-ethylpyridine. A conversion of 57% corresponds to these values. The yield of vinyl pyridine compound after processing is 81%, referred to the converted 2-methyl-5-ethylpyridine.

EXAMPLE 8

The test equipment is the same as in Example 1. Through one line 7450 cu. cm. (6800 g) 2-methyl-5-ethylpyridine are carried per hour, through the other line 2100 cu. cm. per hour of a mixture consisting of 787 g formaldehyde, 1340 g water and 257 g sulphuric acid. The molar proportion 2-methyl-5-ethylpyridine to formaldehyde to sulphuric acid is 2.14 : 1 : 0.1. The reaction temperature is kept at 260° C, the pressure at 50 atmospheres overpressure. The residence time is 5.75 minutes. The reaction mixture obtained per hour contains 4900 g unconverted 2-methyl-5-ethylpyridine, 1557 g 2-vinyl-5-ethylpyridine and 60 g 2-(2-hydroxyethyl)-5-ethylpyridine. This corresponds to a conversion of 60%. The yield of vinyl pyridine compound after processing is 77%, referred to the converted 2-methyl-5-ethylpyridine.

EXAMPLE 9

The test equipment is the same as in Example 1. Through one line 7200 cu. cm. (6600 g) 2-picoline are carried per hour, through the other 2410 cu. cm. per hour of a mixture consisting of 975 g formaldehyde, 1655 g water and 160 g sulphuric acid. The molar proportion of 2-picoline to formaldehyde to sulphuric acid is 2.18 : 1 : 0.05. The reaction temperature is 243° C, the retention time 5.6 minutes; the reaction pressure is kept at 50 atmospheres overpressure. Per hour one obtains a reaction mixture which contains 4450 g unconverted 2-picoline, 1900 g 2-vinyl pyridine and 45 g 2-(2-hydroxyethyl)-pyridine. From this a conversion of 71% is computed. The yield of vinyl pyridine compound after processing is 80% referred to converted 2-picoline.

EXAMPLE 10

The test equipment is the same as in Example 1. Through one line 7200 cu. cm. (6600 g) 4-picoline are carried per hour, through the other per hour 2630 cu. cm. of a mixture consisting of 1063 g formaldehyde, 1800 g water and 175 g sulphuric acid. The molar proportion 4-picoline to formaldehyde to sulphuric acid is 2 : 1 : 0.05. The reaction temperature is kept at 240° C, the reaction pressure at 50 atmospheres overpressure. The retention time is 5.5 minutes. One obtains per hour a mixture which contains 4790 g of unconverted 4-picoline, 1530 g 4-vinyl pyridine and 74 g 4-(2-hydroxyethyl)-pyridine. This corresponds to a 55% conversion. The total yield of vinyl pyridine compound after processing is 78%, referred to 4-picoline.

EXAMPLE 11

Into a 2 liter autoclave one places 1210 g (10 mols) 2-methyl-5-ethylpyridine, 270 g (3.3 mols) 37% aqueous formaldehyde and 15 cu. cm. 89% phosphoric acid. The autoclave is then brought to a cold pressure of 50 atmospheres overpressure by means of an inert gas and subsequently it is heated up as quickly as possible to 180° C (inside temperature). The mixture is kept at this temperature for 1.5 hours. After cooling, the discharge is distilled. First at 50° C/100 mm Hg the 2-methyl-5-ethylpyridine/water azeotrope goes over, then at 60° C/12 mm Hg the 2-methyl-5-ethylpyridine. The 2-vinyl-5-ethylpyridine boils at 84° – 85° C/12 mm Hg. 950 g of unconverted 2-methyl-5-ethylpyridine are recovered and one obtains 187 g 2-vinyl-5-ethylpyridine. From this a conversion of 65% is computed and a yield of vinyl pyridine compound of 65%, referred to converted 2-methyl-5-ethylpyridine.

The products produced by the process are useful as comonomers in polymers. The dyeability of polypropylene-, polyacrylonitrile-, or polyvinylalcohol fibers, e.g., is greatly improved by the presence of a vinylpyridine as a comonomer. Vinylpyridines are used as well as comonomers in various types of rubber for special purposes.

The invention claimed is:

1. Process for the direct conversion in a single stage of an alkyl pyridine to the corresponding vinyl pyridine, consisting essentially of the steps of:
   a. contacting an alkyl pyridine selected from the group consisting of 2-methylpyridine, 4-methylpyridine, 2,4-lutidine, 2,6-lutidine, 2,4,6-collidine, 2,3,6-collidine, 2-methyl-5-ethylpyridine, 2-methylquinoline, 4-methylquinoline, 1-methylisoquinoline, 3-methylisoquinoline, 9-methylacridine, and 9-methylphenanthridine with formaldehyde in the presence of a catalytic amount of an acid catalyst having a pH value less than 5 at a super-atmospheric pressure of between about 30 and about 100 atmospheres and at a temperature between about 200° and about 300°C for a period of time between about 2 and about 10 minutes, the molar proportion of alkyl pyridine compound to formaldehyde being between about 2:1 and about 5:1, and
   b. rapidly cooling the mixture and recovering the resulting vinyl pyridine.

2. The process according to claim 1, in which the pyridine compound reacted is 2-or 4 methyl pyridine in a molar ratio to 3.5 to 1.5 per mol of formaldehyde.

3. The process according to claim 1, in which the catalyst is in a molar concentration of 1–20% with reference to the formaldehyde.

4. The process according to claim 1, in which the pyridine compound reacted is 2-methyl-5ethylpyridine and the catalyst sulfuric acid, the molar ratio of the components being 2 – 5 of 2-methyl-5-ethylpyridine: 1 formaldehyde :0.05 – 0.1 sulfuric acid.

* * * * *